US009195336B2

(12) United States Patent
Ando et al.

(10) Patent No.: US 9,195,336 B2
(45) Date of Patent: Nov. 24, 2015

(54) TOUCH-TYPE INPUTTING DEVICE AND METHOD FOR CONTROLLING THE SAME

(71) Applicant: MURATA MANUFACTURING CO., LTD., Nagaokakyo-Shi, Kyoto-Fu (JP)

(72) Inventors: Masamichi Ando, Nagaokakyo (JP); Nobuhiro Kondo, Nagaokakyo (JP)

(73) Assignee: MURATA MANUFACTURING CO., LTD., Nagakakyo-Shi, Kyoto-Fu (JP)

( * ) Notice: Subject to any disclaimer, the term of this patent is extended or adjusted under 35 U.S.C. 154(b) by 272 days.

(21) Appl. No.: 13/861,454

(22) Filed: Apr. 12, 2013

(65) Prior Publication Data

US 2013/0234988 A1 Sep. 12, 2013

Related U.S. Application Data

(63) Continuation of application No. PCT/JP2011/072197, filed on Sep. 28, 2011.

(30) Foreign Application Priority Data

Oct. 15, 2010 (JP) .................................. 2010-232157

(51) Int. Cl.
*G06F 3/041* (2006.01)
*G06F 17/30* (2006.01)
*G06F 3/0488* (2013.01)

(52) U.S. Cl.
CPC ............ *G06F 3/0414* (2013.01); *G06F 3/0416* (2013.01); *G06F 3/0488* (2013.01); *G06F 17/3053* (2013.01); *G06F 2217/10* (2013.01)

(58) Field of Classification Search
CPC ............ G06F 17/3053; G06F 2217/10; G06F 3/0414; G06F 3/0488
See application file for complete search history.

(56) References Cited

U.S. PATENT DOCUMENTS 5,374,787 A * 12/1994 Miller et al. ................ 178/18.06
5,488,204 A * 1/1996 Mead et al. ................. 178/18.06

(Continued)

FOREIGN PATENT DOCUMENTS

JP 63-300313 A 12/1988
JP 02-297107 A 12/1990

(Continued)

OTHER PUBLICATIONS

Freund, John E. et al. Statistics: A first course, Prentice-Hall, Inc. 1986, p. 45.*

(Continued)

*Primary Examiner* — Michael J Eurice
(74) *Attorney, Agent, or Firm* — Arent Fox LLP

(57) ABSTRACT

A piezoelectric sheet included in a touch panel is provided with a split electrode having a plurality of electrode parts. Lattice-shaped coordinates are set in the touch panel, and voltages generated in the respective electrode parts through pressing manipulations with a predetermined load on the respective lattice points are preliminarily stored in a storage portion as reference voltages. During actual use, actually-measured voltages induced in the respective electrode parts due to a pressing manipulation are detected by a detection portion. The ratios of the measured voltages to the reference voltages are calculated by an operation portion, and the average thereof and the standard deviation there among are determined. The coordinates of the pressed position are determined from the coordinates of four lattice points in the ascending order of standard deviations. The load is multiplied by the ratio to determine the pressing force of the lattice point having a minimum standard deviation.

13 Claims, 6 Drawing Sheets

(56) References Cited

U.S. PATENT DOCUMENTS

| | | | |
|---|---|---|---|
| 5,543,591 A * | 8/1996 | Gillespie et al. | 178/18.03 |
| 5,854,450 A * | 12/1998 | Kent | 178/18.04 |
| 6,337,678 B1 * | 1/2002 | Fish | 345/156 |
| 6,819,312 B2 * | 11/2004 | Fish | 345/156 |
| 8,072,437 B2 * | 12/2011 | Miller et al. | 345/173 |
| 8,823,662 B2 * | 9/2014 | Aono | 345/173 |
| 2002/0044132 A1 * | 4/2002 | Fish | 345/156 |
| 2003/0112228 A1 * | 6/2003 | Gillespie et al. | 345/173 |
| 2003/0146675 A1 * | 8/2003 | Cuhat et al. | 310/319 |
| 2005/0073505 A1 * | 4/2005 | Katsuki et al. | 345/173 |
| 2005/0146512 A1 * | 7/2005 | Hill et al. | 345/173 |
| 2007/0255512 A1 * | 11/2007 | Delenstarr et al. | 702/35 |
| 2008/0062151 A1 * | 3/2008 | Kent | 345/177 |
| 2010/0117993 A1 * | 5/2010 | Kent | 345/177 |
| 2010/0194682 A1 * | 8/2010 | Orr et al. | 345/156 |
| 2010/0194692 A1 * | 8/2010 | Orr et al. | 345/173 |
| 2011/0063241 A1 | 3/2011 | Oh | |

FOREIGN PATENT DOCUMENTS

| | | | | |
|---|---|---|---|---|
| JP | 5-061592 A | | 3/1993 | |
| JP | 1993-061592 A | * | 3/1993 | G06F 3/03 |
| JP | 1994-089143 A | * | 3/1994 | G06C 7/00 |
| JP | 2006-163618 A | | 6/2006 | |
| WO | WO-2009/145455 A2 | | 12/2009 | |

OTHER PUBLICATIONS

PCT/JP2011/072197 Written Opinion dated Oct. 19, 2011.

* cited by examiner

TOUCH-TYPE INPUTTING DEVICE AND METHOD FOR CONTROLLING THE SAME

CROSS REFERENCE TO RELATED APPLICATIONS

The present application is a continuation of International application No. PCT/JP2011/072197, filed Sep. 28, 2011, which claims priority to Japanese Patent Application No. 2010-232157, filed Oct. 15, 2010, the entire contents of each of which are incorporated herein by reference.

FIELD OF THE INVENTION

The present invention relates to touch-type inputting devices and methods for controlling the same and, more particularly, relates to touch-type inputting devices employing piezoelectric sheets and methods for controlling the same.

BACKGROUND OF THE INVENTION

In recent years, there have been significant increases of inputting devices which employ so-called touch-panel systems, namely, touch-type inputting devices. In cellular phones, portable gaming machines, and portable music players, as well as in bank's ATMs and ticket-vending machines in stations, there have been largely increased apparatuses which employ touch panel systems as inputting interfaces, along with developments of techniques for thin displays.

As touch panels having been currently used, there have been mainstreams of resistive types and capacitive types and, furthermore, there have been also touch panels of optical types and electromagnetic-induction types, and touch panels which utilize surface acoustic waves through piezoelectricity. In general, information about positions is detected using such schemes. In other words, information about which position on the touch panel has been touched (pressing-manipulated) by an operator is acquired as coordinate information, and specified processing is executed based on this information. As represented by bank's ATMs, by touching the portions of buttons being displayed on the screen, the operator can manipulate the apparatus, as if the operator has performed pressing manipulations on actual buttons. As a result of recent developments of graphic user interfaces (GUIs) processing techniques, there have been also apparatuses which enable operators to scroll images being displayed therein by stroking the screens, and, further, enable the operators to directly control slidable switches being displayed therein as graphics, with their fingers.

There have been a need for a wide variety of touch panels and, recently, there have been an increased need for acquiring information about pressing forces along with information about positions at the same time. That is, if it is possible to detect two types of information about which position on the screen has been touched by an operator and about how strongly the operator has touched it, it is possible to further improve the manipulability.

As a technique relating thereto, JP 5-61592 A (Patent Document 1) discloses a technique for detecting w information about positions and information about pressing forces, by overlaying a position-detecting device and a pressure-sensitive sensor on each other.

Further, JP 2006-163618 A (Patent Document 2) discloses a method for acquiring pressing-force information using a piezoelectric sheet, and for detecting which portions of a plurality of electrode lines formed in a lattice shape on the piezoelectric sheet detection voltages have appeared at, in order to acquire position information.

However, in the touch panel described in Patent Document 1, the pressure-sensitive sensor formed from a piezoelectric sheet or a pressure-sensitive resistance sheet is overlaid on the ordinary touch panel for only positional detection. This pressure-sensitive sensor is overlaid on the entire surface of the touch panel.

In general, such an ordinary touch panel is installed on an image display device of some type, and thus, is required to have higher transparency. Such a position-detecting touch panel and such a pressure-sensitive sensor both include a plurality of films and electrode layers. By making these films transparent, and by employing transparent electrically-conductive materials such as indium tin oxide (ITO) as the electrode layers, it is possible to cause their entirety to have transparency. However, there has been the problem of poor light transmittance, due to many laminated layers. Further, there is a need for larger numbers of components and processes, which involves an increased cost. Further, position information and pressing-force information are detected separately, which has induced the problem of complicacy of signal processing.

On the other hand, the touch panel 2 described in Patent Document 2 is provided with the lattice-shaped fine wiring electrodes on the piezoelectric sheet, in order to detect position information and pressing-force information at the same time. Such position information is acquired based on which electrodes, out of the lattice-shaped electrodes, intensive signals have been detected from. This necessitates connecting all of these fine wires to an operational processing portion, thereby inducing the problem of significant complicacy of the structure.

Patent Document 1: JP 5-61592 A
Patent Document 2: JP 2006-163618 A

SUMMARY OF THE INVENTION

Therefore, it is an object of the present invention to provide a touch-type inputting device and a method for controlling the same which are capable of overcoming the aforementioned problems.

The present invention is firstly directed to a touch-type inputting device including a touch panel including a piezoelectric sheet having a piezoelectric property, and first and second electrodes facing each other which are formed on the piezoelectric sheet on first and second main surfaces facing each other, at least one of the first and second electrodes being formed to be a split electrode having a plurality of electrode parts electrically insulated from each other, and a manipulation surface to be subjected to a pressing manipulation by an operator being extended along the first main surface of the piezoelectric sheet, wherein the touch-type inputting device is adapted to, when a pressing manipulation has been performed on the manipulation surface of the touch panel, make a comparison among respective voltages generated in the plurality of electrode parts in the split electrode for calculating a pressing-manipulated position and a pressing force. The present invention includes the following structures.

Firstly, the touch-type inputting device according to the present invention includes storage means adapted to preliminarily store voltages obtained through a process for setting a lattice-shaped matrix coordinate system for the manipulation surface of the touch panel, and through a process for measuring the voltages generated in the respective electrode parts due to pressing manipulations with a predetermined load at respective lattice points in the lattice-shaped matrix coordinate system, as reference voltages regarding the respective lattice points.

Further, the touch-type inputting device according to the present invention includes:

first means adapted to determine actually-measured voltages induced in the respective electrode parts due to a pressing manipulation by the operator on the manipulation surface of the touch panel;

second means which is adapted to make a comparison between the electrode part which exhibits the reference voltage having a maximum absolute value and the electrode part which exhibits the measured voltage having a maximum absolute value, and a comparison between the signs thereof, regarding each of the lattice points, and is adapted to define the lattice point as a lattice point to be processed, when there are coincidences between the electrode parts and between the signs;

third means adapted to calculate a ratio of the measured voltage to the reference voltage, for each of the electrode parts, and for each of the lattice points to be processed;

fourth means adapted to determine an average of the ratios for the respective electrode parts, for each of the lattice points to be processed;

fifth means adapted to determine a standard deviation among the ratios, for each of the lattice points to be processed;

sixth means adapted to rank the lattice points to be processed, in an ascending order of the standard deviation;

seventh means adapted to select predetermined n lattice points at upper ranks, out of the ranked lattice points to be processed;

eighth means adapted to determine coordinates (X, Y) of the pressed position due to the pressing manipulation by the operator, according to equations: $X=\Sigma(Xk/Sk)/\Sigma(1/Sk)$, and $Y=\Sigma(Yk/Sk)/\Sigma(1/Sk)$, assuming that the coordinates of the selected lattice points are (Xk, Yk), (k=1, 2, ..., n), and the standard deviations are Sk (k=1, 2, ..., n); and ninth means adapted to determine the pressing force in the pressing manipulation by the operator, by multiplying the load by the average of the ratios regarding the lattice point at the uppermost rank.

The present invention is also directed to a method for controlling the aforementioned touch-type inputting device. Firstly, the method for controlling the touch-type inputting device according to the present invention includes:

a first preparatory process for setting a lattice-shaped matrix coordinate system for the manipulation surface of the touch panel;

a second preparatory process for measuring voltages generated in the respective electrode parts due to pressing manipulations with a predetermined load at respective lattice points in the lattice-shaped matrix coordinate system; and a third preparatory process for preliminarily storing, in a memory, the voltages obtained through the second preparatory process, as reference voltages regarding the respective lattice points.

Then, the method further includes, in actual use, a first implementation process for determining actually-measured voltages induced in the respective electrode parts due to a pressing manipulation by the operator on the manipulation surface of the touch panel;

a second implementation process for making a comparison between the electrode part which exhibits the reference voltage having a maximum absolute value and the electrode part which exhibits the measured voltage having a maximum absolute value, and a comparison between the signs thereof, regarding each of the lattice points, and for defining the lattice point as a lattice point to be processed, when there are coincidences between the electrode parts and between the signs;

a third implementation process for calculating a ratio of the measured voltage to the reference voltage, for each of the electrode parts, and for each of the lattice points to be processed;

a fourth implementation process for determining an average of the ratios for the respective electrode parts, for each of the lattice points to be processed;

a fifth implementation process for determining a standard deviation among the ratios, for each of the lattice points to be processed;

a sixth implementation process for ranking the lattice points to be processed, in an ascending order of the standard deviations;

a seventh implementation process for selecting predetermined n lattice points at upper ranks, out of the ranked lattice points to be processed;

an eighth implementation process for determining coordinates (X, Y) of the pressed position due to the pressing manipulation by the operator, according to equations: $X=\Sigma(Xk/Sk)/\Sigma(1/Sk)$, and $Y=\Sigma(Yk/Sk)/\Sigma(1/Sk)$, assuming that the coordinates of the selected lattice points are (Xk, Yk), (k=1, 2, ..., n), and the standard deviations are Sk (k=1, 2, ..., n); and a ninth implementation process for determining the pressing force in the pressing manipulation by the operator, by multiplying the load by the average of the ratios regarding the lattice point at the uppermost rank.

In the second preparatory process and the first implementation process described above, the voltages induced in the respective electrode parts can be either detected through operations in a direction of pressing (a direction toward the manipulation surface) or detected through operations in a direction of counter-pressing (a direction getting away from the manipulation surface), in the pressing manipulations on the manipulation surface of the touch panel.

According to the present invention, even when the split electrode has a relatively-small number of splits, it is possible to acquire position information about non-discrete positions, namely, about arbitrary positions over the entire surface, and it is also possible to detect pressing forces at the same time, based on discrete reference data such as predetermined reference voltages.

Further, according to the present invention, a comparison is made between the electrode part which exhibits the reference voltage having a maximum absolute value and the electrode part which exhibits the measured voltage having a maximum absolute value, and a comparison is made between the signs thereof, regarding each of the lattice points. Further, the lattice point is defined as a lattice point to be processed, when there are coincidences between the electrode parts and between the signs. This can reduce the burden of the subsequent processing, thereby enabling speed-up of the processing.

According to the present invention, a comparison is made between the electrode parts which exhibit the reference voltages having a maximum absolute value and a second-largest absolute value and the electrode parts which exhibit the measured voltages having a maximum absolute value and a second-largest absolute value, for each of the lattice points. Further, the lattice point is defined as a lattice point to be processed, when there are coincidences between the respective electrode parts and between the signs of the voltages from the respective electrode parts, regardless of the ranks of the voltages. This can reduce erroneous detections.

In the aforementioned preferable embodiments, the determination can be made from only the maximum values, when the second-ranked voltage, out of the measured voltages, has a value smaller than a predetermined threshold value. This can further reduce the burden of the subsequent processing.

In the touch-type inputting device according to the present invention, a glass plate can be placed on the first main surface of the piezoelectric sheet to form the manipulation surface, which can stabilize voltages generated in the respective electrode parts. Further, a rubber-type elastic member can be placed on the second main surface of the piezoelectric sheet, which can also stabilize voltages generated in the respective electrode parts.

In the touch-type inputting device according to the present invention, the piezoelectric sheet can be constituted by a poly-L-lactic-acid (PLLA) sheet having a drawing axis in a predetermined direction. This enables provision of a touch panel with excellent transparency. Further, since PLLA has a piezoelectric constant of $d_{14}$, and therefore, has portions which generate positive voltages and portions which generate negative voltages, according to the expansion thereof in the direction of a planar surface, which facilitates separation of information, thereby realizing an improved resolution.

In the method for controlling the touch-type inputting device according to the present invention, the second preparatory process and the first implementation process can be adapted to make a determination as to whether the voltages induced in the respective electrode parts have been detected through operations in the direction of pressing or through operations in the direction of counter-pressing, in the pressing manipulations on the manipulation surface of the touch panel, based on polarities of the voltages having the maximum absolute values, out of the voltages induced in the respective electrode parts. This enables determinations with higher reliability.

In the method for controlling the touch-type inputting device according to the present invention, in the third implementation process, out of the reference voltages, the reference voltages from the electrode parts which exhibit voltage values smaller than a predetermined threshold value can be prevented from being used. This can improve the reliability of the processing, and can reduce the burden of the processing ability.

BRIEF EXPLANATION OF THE DRAWINGS

FIGS. 1(A) and 1(B) illustrates a touch panel 1 included in a touch-type inputting device according to an embodiment of the present invention, wherein FIG. 1(A) is a plan view, and FIG. 1(B) is a cross-sectional view taken along line B-B in (A).

DETAILED DESCRIPTION OF THE INVENTION

Figure 1A:
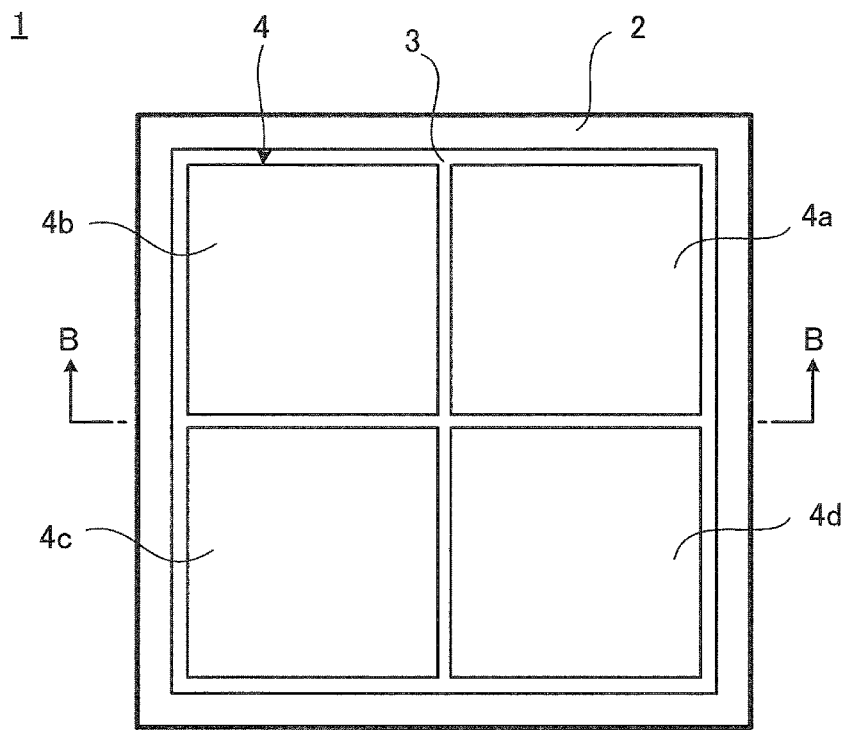
Figure 1B:
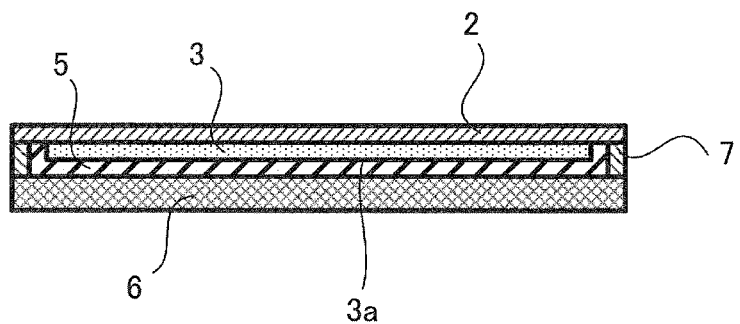

FIGS. 1(A) and 1(B) illustrate a touch panel 1 included in a touch-type inputting device according to an embodiment of the present invention. In FIGS. 1(A) and 1(B), FIG. 1(A) is a plan view, and FIG. 1(B) is a cross-sectional view taken along line B-B in FIG. 1(A). Further, in the cross-sectional view FIG. 1(B), the respective components are illustrated in such a way as to exaggerate their thicknesses.

As illustrated in FIG. 1(B), the touch panel 1 has a cross-sectional structure configured by a sheet-type protective member 2, a piezoelectric sheet 3 having a piezoelectric characteristic, a rubber-type elastic member 5, and a base member 6 which are laminated in the mentioned order. More specifically, the piezoelectric sheet 3 is attached to the protective member 2, and the rubber-type elastic member 5 is embedded in the space between the piezoelectric sheet 3 and the base member 6 which are separated from each other by a spacer 7 inserted between the protective member 2 and the base member 6. Further, the rubber-type elastic member 5, which is for allowing the deformation of the piezoelectric sheet 3, is made of an elastomer or a gel member, but a space can be left between the piezoelectric sheet 3 and the base member 6.

In general, the touch panel 1 is placed on a surface of a flat panel display (FPD), such as a liquid crystal display or an organic EL display. Accordingly, the respective components forming the touch panel 1 are preferably made of materials having transparency. Further, in this case, the aforementioned base member 6 can be formed from an FPD.

Referring to FIG. 1(A), there are illustrated electrodes 4, and first and second electrodes facing each other are formed on the piezoelectric sheet 3 on its first and second main surfaces facing each other, and at least one of the first and second electrodes is made to be a split electrode having a plurality of electrode parts which are electrically insulated from each other.

In FIG. 1(A), the piezoelectric sheet 3 is illustrated in a state where it is viewed transparently through the protective member 2, and particularly, the first electrode 4 formed on a first main surface 3a facing downwardly is illustrated transparently (see FIG. 1(B)). The first electrode 4 is made to be a split electrode having four electrode parts 4a to 4d, for example. Further, in FIG. 1(B), the electrodes are not illustrated.

The second electrode formed on the second main surface which faces upwardly, which is not illustrated, can be made to be either a split electrode having four electrode parts similarly to the first electrode 4 or a uniform electrode which evenly faces the four electrode parts 4a to 4d in the first electrode 4. As in the latter case, the second electrode formed on the second main surface, which exists in the side attached to the protective member 2, can be made to be a uniform electrode to be used as a ground electrode, which enables effective elimination of external noises. Alternatively, the second electrode formed on the second main surface can be made to be a split electrode, while the first electrode 4 formed on the first main surface 3a can be made to be a uniform electrode which evenly faces the second electrode as the split electrode.

Further, the number of splits in the split electrode is not limited to four and can be changed according to the design, and the shapes of the respective electrode parts and the widths of the split lines are also arbitrary. For example, the split electrode can be split by split lines with larger widths, to have a plurality of electrode parts which are distributed more discretely.

The protective member 2, which forms a manipulation surface to be subjected to pressing manipulations by an operator, is made of a glass plate or a resin film. In this case, as a resin film, it is possible to employ a film made of an acrylic resin, polyethylene terephthalate, polyethylene naphthalate, polycarbonate, or the like. Although not illustrated, on the surface of the protective member 2, it is possible to provide an anti-reflective film or a hard coat for preventing flaws and contaminations. It is possible to form the protective member 2 from a glass plate and to form, thereon, a resin film for preventing fractures.

As the material forming the piezoelectric sheet 3, it is possible to employ an electret film made of a polypropylene, a polyvinylidene difluoride (PVDF) or poly-L-lactic acid (PLLA) as a piezoelectric member, or a composite member formed from a resin and piezoelectric ceramic powder dispersed therein.

As the materials forming the aforementioned first electrode 4 and the second electrode, it is possible to employ inorganic materials mainly composed of indium tin oxide (ITO), indium-oxide-zinc-oxide (IZO: registered trademark) or zinc oxide, or organic materials mainly composed of polythiophene. However, in cases where there is no need for transparency, it is possible to employ metal materials, such as Al, Ag, Au, Cu. As a method for forming the electrodes, it is possible to employ vapor deposition, sputtering, plating, coating, and the like.

Figure 2:
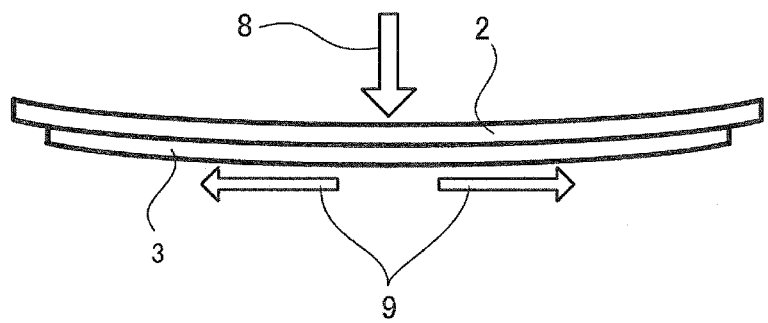
FIG. 2 is a view illustrating tensile stresses 9 induced in a piezoelectric sheet 3, when a stress 8 is applied to the touch panel 1 illustrated in FIGS. 1(A) and 1(B).

As illustrated in FIG. 2, if a stress 8 of some type is applied to the protective member 2 from thereabove, the protective member 2 is bent, thereby applying, to the piezoelectric sheet 3, tensile stresses 9 corresponding to the bending of the protective member 2. The stress distribution induced in the piezoelectric sheet 3 is varied depending on the pressed position and the pressing force. In other words, in cases where the electrode is split, the voltages induced from the respective electrode parts are varied.

Figure 3:
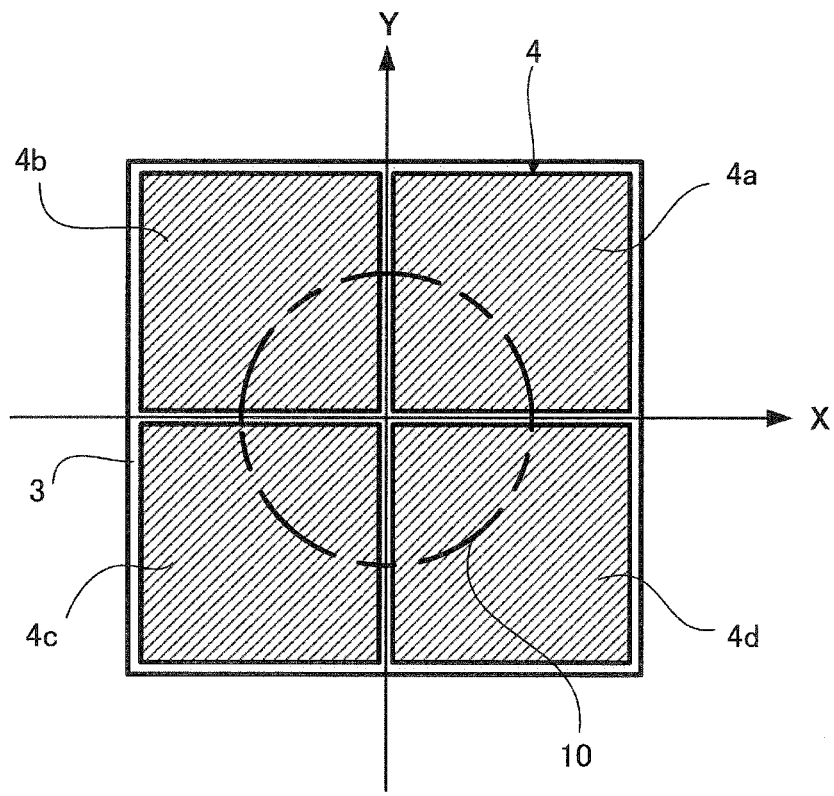
FIG. 3 is a plan view illustrating the piezoelectric sheet 3 and an X-Y coordinate system to be set for a manipulation surface.

FIG. 3 illustrates the piezoelectric sheet 3, wherein there is illustrated an X-Y coordinate system to be set for the manipulation surface provided by the protective member 2 of the touch panel 1. Further, in FIG. 3, similarly, there are illustrated the electrode parts 4a to 4d in a state where they are transparently viewed through the piezoelectric sheet 3.

Figure 4:
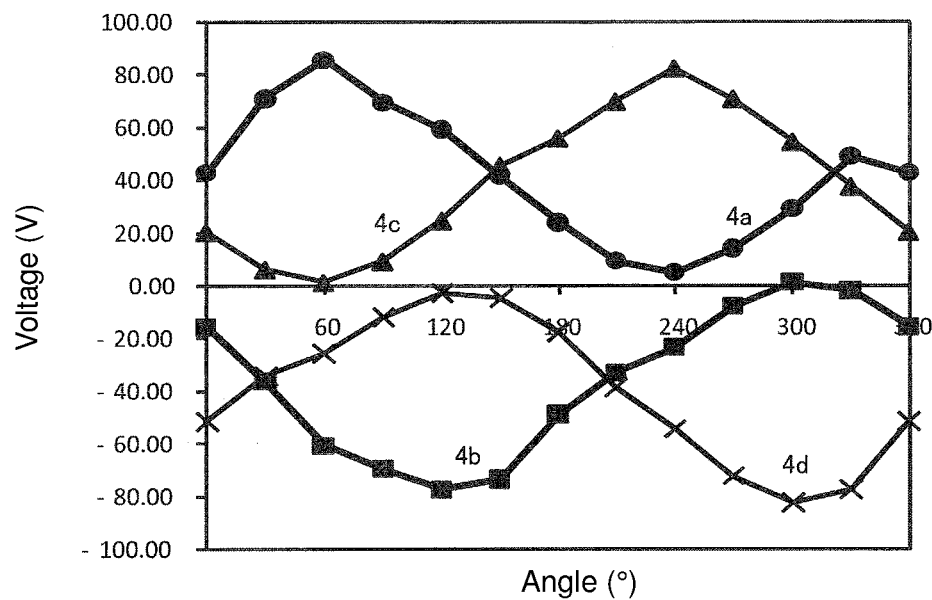
FIG. 4 illustrates the values of voltages induced in respective electrode parts 4a to 4d, when pressing manipulations are performed with a constant pressing force, discretely, along a circle 10 illustrated in FIG. 3, in cases where a PLLA sheet is employed as the piezoelectric sheet 3.

FIG. 4 illustrates the values of voltages induced in the respective electrode parts 4a to 4d, when pressing manipulations are performed with a constant pressing force, discretely, along a circle 10 illustrated in FIG. 3, in cases where a PLLA sheet is employed as the piezoelectric sheet 3. Referring to FIG. 4, the horizontal axis represents the angle, which is the angle between a point on the circle 10 and the X coordinate axis. Further, the direction of the drawing axis of the PLLA, which forms the piezoelectric sheet 3, is coincident with the direction of the X axis in FIG. 3. Further, the direction of the drawing axis is a design matter and, therefore, is not limited thereto.

Figure 5:
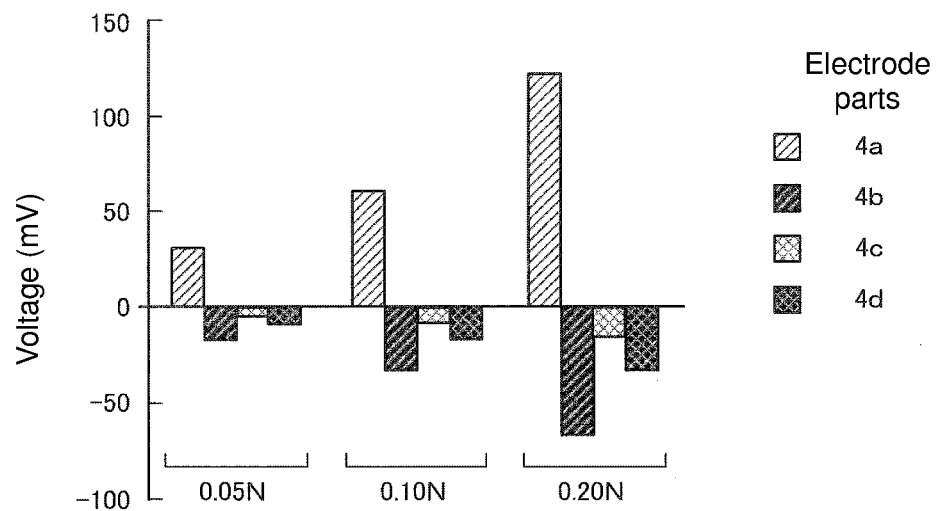
FIG. 5 is a view illustrating a bar graph illustrating the magnitudes of voltages induced in the electrode parts 4a to 4d, in association with the magnitudes of pressing forces, when pressing manipulations are applied to an origin point in FIG. 3.

FIG. 5 illustrates a bar graph illustrating the magnitudes of voltages induced in the electrode parts 4a to 4d, in association with the magnitudes of pressing forces, when pressing manipulations are applied to a predetermined point. It can be seen from FIG. 5 that the induced voltages are changed in proportion to the magnitude of the pressing force. Further, it can be seen that the ratio of the magnitude of the voltage induced from each electrode part to the electric potential at a certain electrode part, as a reference, was not changed.

Accordingly, by analyzing the aforementioned ratio, it is possible to identify the pressed position. Further, by analyzing the magnitude of the voltage, it is possible to detect the pressing force.

PLLA has a piezoelectric constant of $d_{14}$ and, therefore, has portions which generate positive voltages and portions which generate negative voltages, according to the expansion thereof in the direction of a planar surface, which facilitates separation of information, thereby improving the resolution. On the contrary, electrets, ceramic composite members, and PVDF as described above have a piezoelectric constant of $d_{31}$, which causes all the electrode parts to generate voltages having the same sign. Therefore, it is undeniable that they provide lower resolutions than that of PLLA.

Next, there will be described a data processing method which is a characteristic structure of the present invention.

Figure 6:
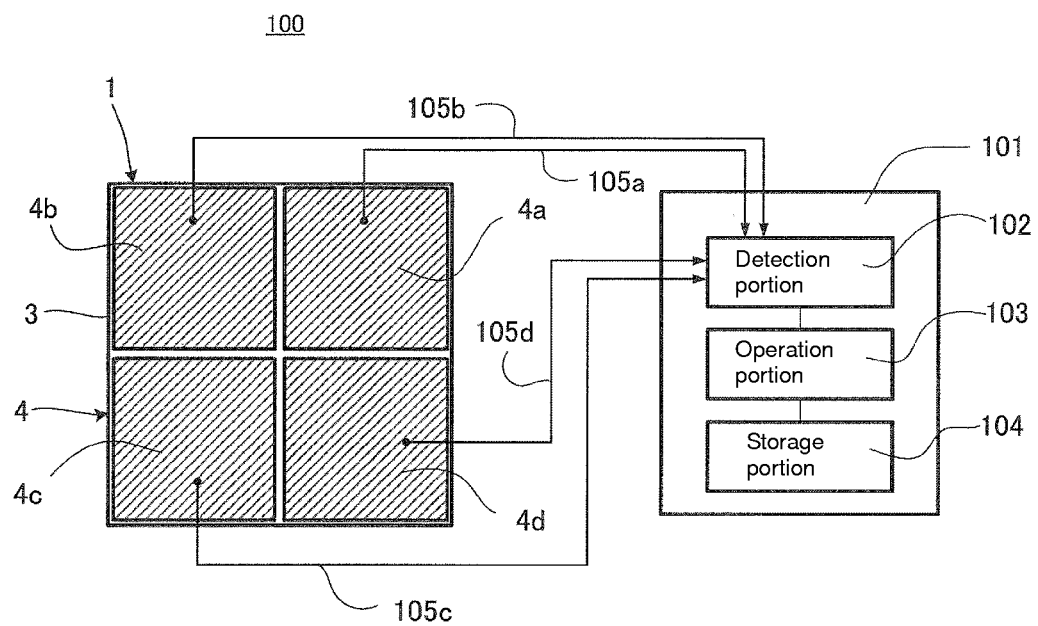
FIG. 6 is a block diagram illustrating the circuit structure of a touch-type inputting device 100 including the touch panel 1 illustrated in FIGS. 1(A) and 1(B).

FIG. 6 is a block diagram illustrating the circuit structure of the touch-type inputting device 100 including the aforementioned touch panel 1. The touch-type inputting device 100 includes the touch panel 1 and a processing device 101, wherein the processing device 101 includes a detection portion 102, an operation portion 103, and a storage portion 104.

Referring to FIG. 6, the voltages induced in the respective electrode parts 4a to 4d are transmitted to the detection portion 102 through respective connection lines 105a to 105d, and thus, the respective voltages are amplified therein. The amplified voltages are analyzed by the operation portion 103 to determine the positions and the pressing forces. The storage portion 104 stores preliminarily-acquired reference voltages.

First, there will be described preparatory processing to be preliminarily performed before actual use of the touch-type inputting device 100.

Figure 7:
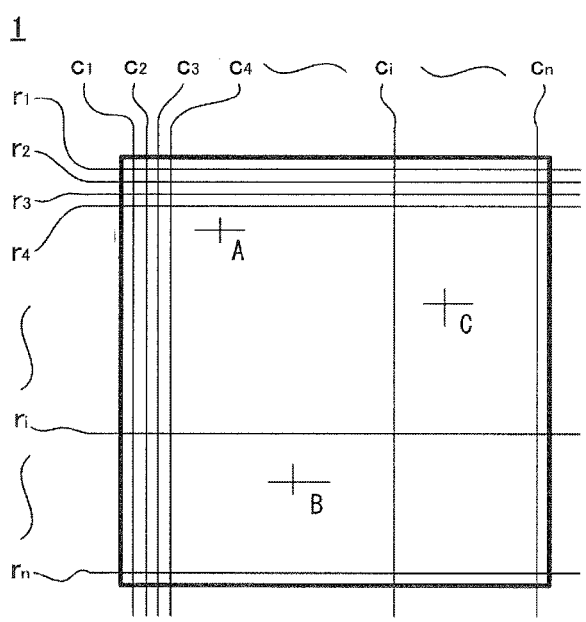
FIG. 7 is a view for describing lattice-shaped matrix coordinates which are set for the manipulation surface of the touch panel 1.

Firstly, as illustrated in FIG. 7, as a first preparatory process, a lattice-shaped matrix coordinate system is set for the manipulation surface of the touch panel 1. In FIG. 7, the electrode parts 4a to 4d are not illustrated. The lattice points in the matrix coordinate system are imaginary points, and therefore, are not drawn on the manipulation surface, for example. The number of lattice points, namely, the number of splits provided along the vertical axis and the horizontal axis are arbitrary. As the splits are made finer, the resolution is made higher, but this preparatory procedure and subsequent operating processing become more complicated.

According to the present invention, it is possible to provide a method for accurately detecting positions, even in states where the lattice points are defined with a certain degree of roughness. The lattice points are required only to be defined in such a way as to provide, therebetween, spacing of about 10 to 100 times the finally-required resolution. For example, when the required resolution is 0.2 mm, the lattice points are required only to be defined, in such a way as to provide, therebetween, spacing of about 2 to 20 mm. Whether it should be made to be 10 times or 100 times the required resolution depends on the detection sensitivity of the piezoelectric sheet 3. This depends on the thickness, the piezoelectric constant, and the uniformity of the piezoelectric sheet 3, and on the material of the protective member 2, and therefore, is a design matter.

From experiments, it has been found that it is possible to obtain relatively-stable voltages, by forming the protective member 2 from a thin glass plate. Further, by forming the protective member 2 from a thin resin film, it is possible to obtain relatively-stable voltages, by inserting a rubber-type elastic member or a gel member between the piezoelectric sheet 3 and the base member 6.

Next, as a second preparatory process, a predetermined pressing force, which has been preliminarily determined, is applied to each of all the lattice points and, at this time, the voltage generated in each of the electrode parts 4a to 4d is determined.

Such a piezoelectric member is caused to generate voltages both through operations in the direction of pressing (the direction toward the manipulation surface) and through operations in the direction of counter-pressing (the direction getting away from the manipulation surface). Therefore, it is desirable to preliminarily acquire the voltages generated through both operations. Actual measurements thereof are performed using a robot, and an automated measurement apparatus which is operated in conjunction with the robot. Desirably, a plurality of measurements are performed, and the results are averaged or pieces of data at multiple points are subjected to least square approximation.

Next, as a third preparatory process, the voltages obtained through the second preparatory process are stored in the storage portion 104, as reference voltages for the respective lattice points, along with the coordinate values of the respective lattice points.

In cases where n lines are set in each of the vertical direction and the horizontal direction, the number of lattice points is n×n. It is not always necessary to make the number of splits in the vertical direction equal to the number of splits in the horizontal direction. Further, there is no need for evenly spacing all the splits from each other, and it is possible to provide different spaces between the lattices, in such a way as to divide them into areas required to have higher resolutions and areas required to have lower resolutions.

Further, particularly, in cases where the protective member 2 is made of a glass plate, if a center area is pressed, this induces a larger mechanical change than mechanical changes induced by pressing peripheral areas. Accordingly, voltages with larger "variety" are detected around the center, while superimpositions of noises tend to occur at peripheral portions. To cope therewith, larger numbers of splits may be provided at peripheral portions, in some cases.

The aforementioned processes are preparatory processes to be performed before the actual use of the touch-type inputting device 100. Next, there will be described implementation processes to be implemented during actual use.

Figure 8:
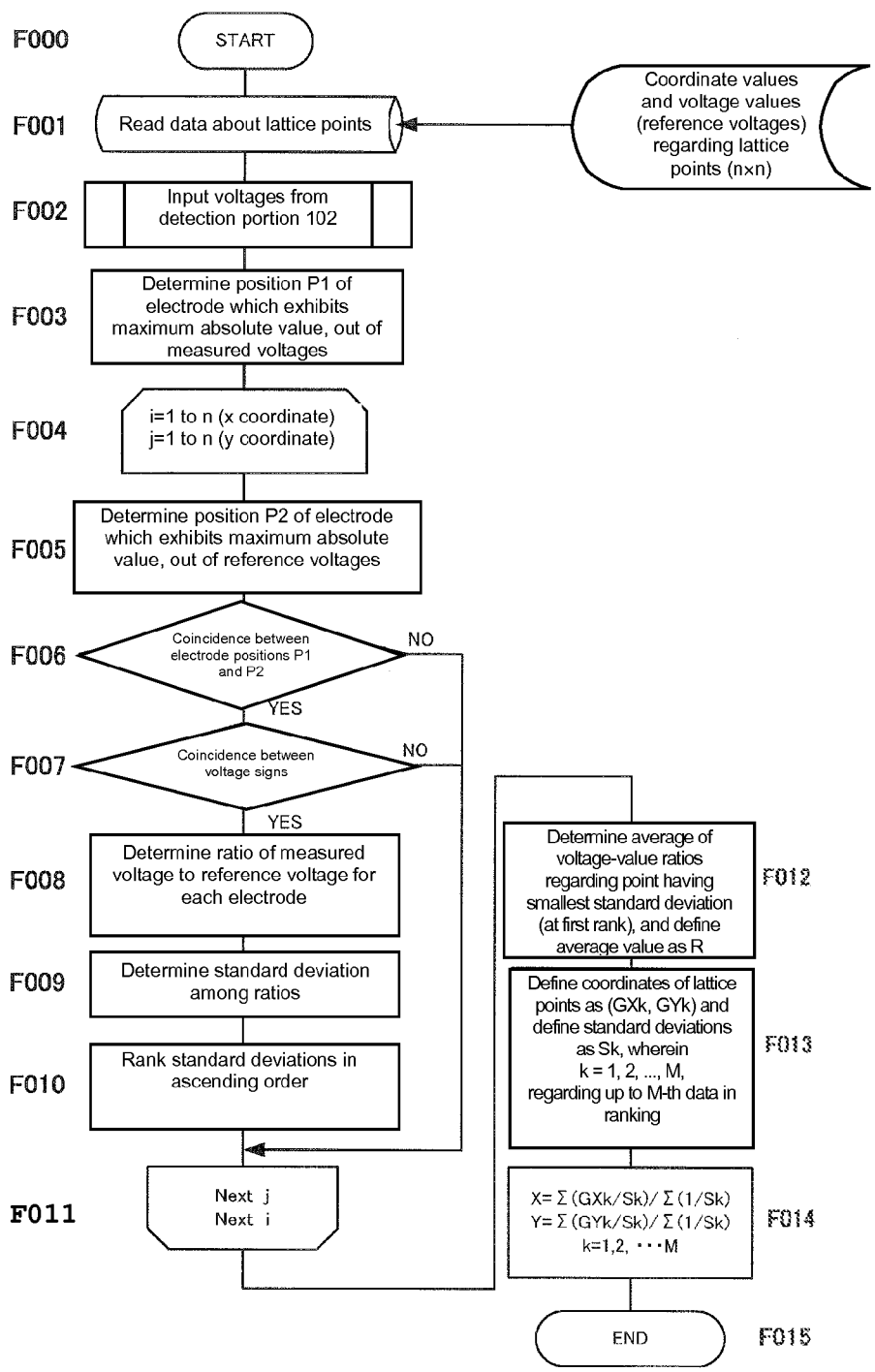
FIG. 8 is a flow diagram illustrating a coordinate detection algorithm which is executed by an operation portion 103 illustrated in FIG. 6.

During actual use, the lattice points are not necessarily touched. The method for determining the coordinates in this case will be described. FIG. 8 illustrates a coordinate detection algorithm which is executed by the operation portion 103. Referring to FIG. 8, respective flows will be described.

F000:
Here, the program starts.
This program can be started by being triggered by the detection portion 102, wherein such triggering can be caused by a voltage induced in the touch panel 1. Also, this program can be continuously and repeatedly executed at constant intervals.

F001:
The operation portion 103 reads, from the storage portion 104, the coordinates of the respective lattice points, and the voltages induced in the respective electrode parts 4a to 4d when reference pressing is applied to these points.
It is not necessary that this processing is executed every time the touch panel 1 has been pressed. Once the data has been loaded into the CPU, this processing is not required to be executed thereafter.

F002:
Measured voltages (the values of voltages from the respective electrode parts 4a to 4d) are read from the detection portion 102.
In this case, data about actually-measured voltages induced in the respective electrode parts 4a to 4d due to a pressing manipulation by the operator on the manipulation surface of the touch panel 1 has been transmitted to the detection portion 102.

F003:
Out of the measured voltages from the electrode parts 4a to 4d, which have been read in F002, the position of the electrode part which exhibits a maximum absolute voltage value is recognized, and this position is defined as P1. Further, the sign of the measured voltage is temporarily stored.

F004:
This step is the upper end of repetitive processing.
The repetitive processing is executed for all the lattice points.

F005:
Out of the reference voltages regarding each lattice point to be currently subjected to calculations, the position of the electrode part which exhibits a maximum absolute voltage value, out of the electrode parts 4a to 4d, is recognized, and this position is defined as P2. Further, the sign of the reference voltage is temporarily stored.

F006:
A comparison is made between the position P1 of the electrode part and the position P2 of the electrode part. If the position P1 and the position P2 are the same, the processing proceeds to F007. If the position P1 and the position P2 are different from each other, the processing proceeds to F011.

F007:
A comparison is made between the sign of the measured voltage which was temporarily stored in F003 and the sign of the reference voltage which was temporarily stored in F005. If the signs are the same, the processing proceeds to F008. If the signs are different from each other, the processing proceeds to F011.

F008:
The ratio of the measured voltage to the reference voltage is determined, with respect to the electrode part having coincidences between the positions and the signs.

Hereinafter, the processes executed in the steps in F003 to F008 will be partially exemplified.

It is assumed that the measured voltage from the electrode part 4a is 195(V), the measured voltage from the electrode part 4b is −128(V), the measured voltage from the electrode part 4c is 48(V), and the measured voltage from the electrode part 4d is −90(V).

On the other hand, the reference voltages from the electrode parts 4a to 4d regarding a lattice point A (see FIG. 7) are 101, −60, 28, −40 (the unit is not described), respectively. Similarly, the reference voltages from the electrode parts 4a to 4d regarding a lattice point B (see FIG. 7) are 94, −63, 28, −46 (the unit is not described), respectively. Similarly, the reference voltages from the electrode parts 4a to 4d regarding a lattice point C (see FIG. 7) are 30, −35, 80, −70 (the unit is not described), respectively.

Firstly, in F003, the measured voltage having the maximum absolute value and the sign thereof are determined. In this case, "195" from the electrode part 4a is the maximum absolute voltage value. Accordingly, in this case, information indicating that the electrode part which exhibits the maximum voltage, out of the absolute voltage values, is the electrode part 4a, and the sign of the voltage is plus is stored.

In cases where the lattice point A is to be subjected to calculations in F004, the reference voltage having the maximum absolute value regarding the lattice point A, and the sign thereof are determined in F005. In this case, "101" from the electrode part 4a is the maximum absolute voltage value. Accordingly, in this case, information indicating that the electrode part which exhibits the maximum voltage, out of the absolute voltage values, is the electrode part 4a, and the sign of the voltage is plus is stored.

In F006, a comparison is made between the electrode-position information resulting from F003 and the electrode-position information resulting from F005. In this case, these electrode positions are both the electrode part 4a, which are coincident with each other, and therefore, the processing proceeds to F007.

In F007, a comparison is made between the sign information resulting from F003 and the sign information resulting from F005. In this case, these sign information are both plus, which are coincident with each other, and therefore, the processing proceeds to F008.

In F008, the ratio of the measured voltage to the reference voltage is calculated, for all the electrode parts 4a to 4d. Table 1 indicates the results.

TABLE 1

Lattice point A

| Electrode part | Measured voltage | Reference voltage | Ratio |
|---|---|---|---|
| a | 195 | 101 | 1.93 |
| b | −128 | −60 | 2.13 |
| c | 48 | 28 | 1.71 |
| d | −90 | −40 | 2.25 |

Standard deviation → 0.24

Similarly, in cases where the lattice point B is to be subjected to calculations in F004, "94" from the electrode part 4a is the maximum absolute voltage value, in the processing in F005. Accordingly, in this case, information indicating that the electrode part which exhibits the maximum voltage, out of the absolute voltage values, is the electrode part 4a, and the sign of the voltage is plus is stored.

In F006, a comparison is made between the electrode-position information resulting from F003 and the electrode-position information resulting from F005. In this case, these electrode positions are both the electrode part 4a, which are coincident with each other, and the processing proceeds to F007.

In F007, a comparison is made between the sign information resulting from F003 and the sign information resulting from F005. In this case, these sign information are both plus, which are coincident with each other, and therefore, the processing proceeds to F008.

In F008, the ratio of the measured voltage to the reference voltage is calculated, for all the electrode parts 4a to 4d. Table 2 indicates the results.

TABLE 2

Lattice point B

| Electrode part | Measured voltage | Reference voltage | Ratio |
|---|---|---|---|
| a | 195 | 94 | 2.07 |
| b | −128 | −63 | 2.03 |
| c | 48 | 28 | 1.71 |
| d | −90 | −46 | 1.96 |

Standard deviation → 0.16

Similarly, in cases where the lattice point C is to be subjected to calculations in F004, "80" from the electrode part 4c is the maximum absolute voltage value, in the processing in F005. Accordingly, in this case, information indicating that the electrode part which exhibits the maximum voltage, out of the absolute voltage values, is the electrode part 4c, and the sign of the voltage is plus is stored.

In F006, a comparison is made between the electrode-position information resulting from F003 and the electrode-position information resulting from F005. In this case, these electrode positions are not coincident with each other, and therefore, F007 to F010 are skipped.

In this case, for the sake of description, the ratios of the measured voltages to the reference voltages regarding the lattice point C are also calculated, which are illustrated in Table 3 (these calculations are not implemented, in actual).

TABLE 3

Lattice point C

| Electrode part | Measured voltage | Reference voltage | Ratio |
|---|---|---|---|
| a | 195 | 30 | 6.50 |
| b | −128 | −35 | 3.66 |
| c | 48 | 80 | 0.60 |
| d | −90 | −70 | 1.29 |

Standard deviation → 2.67

Regarding the lattice point A and the lattice point B, as indicated in Table 1 and Table 2, as a result of comparisons between the measured voltages and the reference voltages, the ratios therebetween at any of the electrode parts are determined to be about two. On the other hand, regarding the lattice point C, as indicated in Table 3, the ratios between the measured voltages and the reference voltages are different from each other, among the electrode parts.

From Tables 1 to 3, it can be seen that the lattice point C is far from the actually-pressed point, and a point near the lattice point A and the lattice point B was pressed. This consideration is made by neglecting measurement errors and the like. Accordingly, it can be seen that the lattice point C can be eliminated from the lattice points to be subjected to calculations.

The lattice points having coincidences between the electrode-part positions which generate maximum voltages and between the signs thereof are defined as lattice points to be subjected to calculations, while the other lattice points are eliminated from the lattice points to be subjected to calculations. This can omit the processing in F008 to F010, thereby reducing the burden of the processing.

In determining the ratios, it is premised that all the signs are coincident with each other. Accordingly, determinations of the signs are made for the other electrode parts than the electrode part which exhibits the maximum absolute value in the processing in F008, and if the signs are not coincident with each other, it is possible to interrupt the processing at this time and to jump to F011. However, when the measured voltages are around zero, there is a possibility of reversing of the signs. Therefore, to cope therewith, it is possible to preliminarily set a threshold value. In the processing, if the reference voltage from an electrode part is lower than the threshold value, the determination of the signs of the voltages can be prevented from being performed, and only the data about this electrode part can be prevented from being used in the subsequent processing.

For example, in the next step, standard deviation calculations are performed for the four points. However, in cases where there is a reference voltage lower than the threshold value as described above, the calculations should be performed for the points other than the point which exhibits this reference voltage. In this manner, in cases where there is a reference voltage around zero, it is possible to prevent the calculated ratio from being extremely larger.

F009:

A standard deviation among the ratios regarding the respective electrode parts is determined.

Tables 1 to 3 further represent examples of the standard deviations. As can be seen from Tables 1 to 3, the smaller the variation among the ratios, the closer to this lattice point the pressed point exists, and the smaller the standard deviation.

If the standard deviation is zero, this indicates that the pressing was performed at this lattice point. In actual, there is an extremely smaller possibility that the standard deviation comes to be zero, due to influences of errors. However, if it comes to be zero, the subsequent coordinate determination processing can be interrupted, and the coordinates of the lattice point itself can be defined as the coordinates of the pressed point. In the actual program, a threshold value for standard deviations has been preliminarily set and, if the standard deviation comes to be smaller than the threshold value, the subsequent coordinate determination processing is interrupted, and the coordinates of the pressed point are determined to be the coordinates of the lattice point itself.

F010:

The standard deviations obtained from the previous processing are ranked.

Since this is repetitive processing, ranking has been already determined through the previous series of operations. Accordingly, where the currently-determined standard deviation should be positioned in the previous ranking is determined through calculations, and the ranks of the subsequent data are shifted downwardly.

F011:

This step is the lower end of the repetitive processing.

F004 to F011 are repeated until the completion of the calculations for all the lattice points.

F012:

An average value of the ratios of the measured voltages to the reference voltage data is determined regarding the lattice point positioned at the uppermost rank in the last processing in F010, and this is defined as the pressing-force ratio.

For example, out of the lattice points A to C which are represented in Tables 1 to 3, if the lattice point B is determined to be the point at the first rank, averaging of the ratios results in 1.943. Accordingly, in cases where the reference pressing force is set to be 0.10 N, it can be determined that the actual pressing force is about 0.20 N.

F013:

As illustrated in FIG. 8, numeric values are assigned to variable values.

In cases where determinations should be performed for up to the M-th data in the ranking, "k" is set as follows: k=1, 2, ..., M, assuming that the coordinates of the lattice points are (GXk, GYk), and the standard deviation is Sk. In this case, in practice, it is sufficient that M is set to be 3 or 4. If it is more, this will only increase the amount of calculations, thereby increasing errors.

F014:

Calculations are performed as illustrated in FIG. 8.

Assuming that the coordinates to be determined are (X, Y), they can be determined from the following equations.

$$X = \Sigma(GXk/Sk)/\Sigma(1/Sk) \quad (1), \text{ and}$$

$$Y = \Sigma(GYk/Sk)/\Sigma(1/Sk) \quad (2)$$

(wherein k=1, 2, ..., M)

Figure 9:
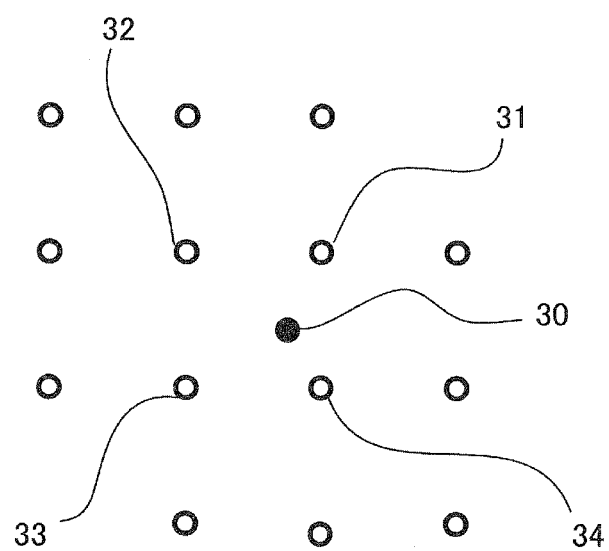
FIG. 9 is a view for describing images of determinations of the coordinates of a pressing-manipulated point, which is executed using the coordinate detection algorithm illustrated in FIG. 8.

The determination of the coordinates of the pressing-manipulated point can be imagined as follows. FIG. 9 extractively illustrates the vicinity of lattice points at higher ranks, assuming that M equals to 4. Referring to FIG. 9, there are illustrated lattice points 31 to 34, near the pressing-manipulated point 30. Further, these lattice points do not exist on the touch panel 1, such that they are viewable.

Through the aforementioned ranking, it is determined that the lattice point 34 is at the first rank, the lattice point 31 is at the second rank, the lattice point 33 is at the third rank, and the lattice point 32 is at the fourth rank. Assuming that the respective coordinates of the first-ranked lattice point 34, the second-ranked lattice point 31, the third-ranked lattice point 33, and the fourth-ranked lattice point 32 are (−20, 5), (−20, 10), (−25, 5) and (−25, 10), and further, the respective standard deviations thereof are 0.05, 0.08, 0.13, and 0.18, the coordinates (X, Y) of the pressing-manipulated point 30 can be determined as (X, Y)=(−21.45, 6.97), according to the equations (1) and (2).

In the aforementioned description, there has been described a method for processing data detected through operations in the direction of pressing, during pressing manipulations. However, voltages are also generated when releasing a finger or a pen having been pressed thereto, namely, during operations in the direction of counter-pressing, and these voltages have the opposite polarity from that generated during operations in the direction of pressing. Regardless of whether the piezoelectric sheet 3 is made of PLLA or PVDF, the voltages detected by the detection portion 102 have a fixed polarity, in focusing attention on the electrode part from which the largest voltage was detected. Accordingly, by focusing attention on the polarity thereof, it is possible to distinguish between operations in the direction of pressing and operations in the direction of counter-pressing.

During operations in the direction of counter-pressing, all the electrode parts are caused to generate voltages having the opposite polarity from that of voltages generated during pressing operations. Accordingly, by reading the polarity thereof in the reversed way, it is possible to directly utilize data obtained through operations in the direction of pressing.

Further, by using data acquired through operations in the direction of counter-pressing, in the data acquisition process, it is possible to perform detections according to the same algorithm.

It is also possible to perform detections of positions and detections of pressing forces with data obtained through operations in the direction of pressing, while performing nothing during operations in the direction of counter-pressing, as a matter of course. Alternatively, it is possible to perform detections only through counter-pressing operations, while performing nothing during operations in the direction of pressing. Further, it is also possible to employ a method for performing detections of positions through operations in the direction of pressing, while performing detections of pressing forces through operations in the direction of counter-pressing. Also, it is possible to employ a method in the reversed way.

Further, it is also possible to employ a method for performing detections of pressing forces through both operations in the direction of pressing and operations in the direction of counter-pressing, and averaging the pressing forces. Also, it is possible to treat results of operations in the direction of pressing and operations in the direction of counter-pressing, as different results.

Further, in pressing manipulations, the detected voltages are changed, by changing the pressing speed or releasing speed. Therefore, in cases of applications to gaming machines, it is possible to perform pressing manipulations in different ways, such as slow pressing, rapid pressing, slow release and rapid release.

As described above, with the present invention, even when the split electrode has a smaller number of splits as a plurality of electrode parts, it is possible to realize a touch-type inputting device capable of detecting coordinate values and pressing forces at the same time, successively over the entire planar surface (without discretization), only by providing discrete basic data.

Further, the touch panel 1 is not necessarily required to have transparency, depending on the application thereof. In this case, for example, all or some of the protective member 2, the piezoelectric sheet 3, the electrodes including the first electrode 4, the rubber-type elastic member 5 and the base member 6 can be made to be non-transparent.

DESCRIPTION OF REFERENCE SYMBOLS

1 Touch panel
2 Protective member
3 Piezoelectric sheet
3a First main surface
4 First electrode
4a to 4d Electrode part
5 Rubber-type elastic member
6 Base member
30 Pressing-manipulated point
31 to 34 Lattice point
100 Touch-type inputting device
101 Processing device
102 Detection portion
103 Operation portion
104 Storage portion

The invention claimed is:

1. A touch-type inputting device comprising:
a touch panel including a piezoelectric sheet having a piezoelectric property, and first and second electrodes on respective first and second opposed main surfaces of the piezoelectric sheet, at least one of the first and second electrodes being a split electrode having a plurality of electrode parts electrically insulated from each other, and a manipulation surface to be subjected to a pressing manipulation by an operator being extended along the first main surface of the piezoelectric sheet,
the touch-type inputting device being adapted to, when the pressing manipulation has been performed on the manipulation surface of the touch panel, make a comparison among respective voltages generated in the plurality of electrode parts in the split electrode so as to calculate a pressing-manipulated position and a pressing force;
a memory adapted to preliminarily store voltages obtained through a process that sets a lattice-shaped matrix coordinate system for the manipulation surface of the touch panel, and through a process that measures the voltages generated in the plurality of electrode parts due to calibrating pressing manipulations with a predetermined load at respective lattice points in the lattice-shaped matrix coordinate system, as reference voltages regarding the respective lattice points;
a processing device configured to:
determine actually-measured voltages induced in the respective electrode parts due to the pressing manipulation by the operator on the manipulation surface of the touch panel;
make a first comparison between the electrode part which exhibits the reference voltage having a maximum absolute value and the electrode part which exhibits the actually measured voltage having a maximum absolute value, and make a second comparison between the signs thereof, regarding each of the lattice points, and further adapted to define the lattice point as a lattice point to be processed when there are coincidences between the electrode parts and between the signs;
calculate a ratio of the actually measured voltage stored in the memory to the reference voltage for each of the electrode parts and for each of the lattice points to be processed, determine an average of the ratios for the respective electrode parts, and calculate a standard deviation among the ratios;
rank the lattice points to be processed in an ascending order of the standard deviation thereof and store the ranked lattice points in the memory;
select predetermined n lattice points at upper ranks out of the ranked lattice points stored in the memory and
determine X and Y coordinates of a pressed position on the manipulation surface of the touch panel due to the pressing manipulation by the operator according to equations: $X=\Sigma(Xk/Sk)/\Sigma(1/Sk)$, and $Y=\Sigma(Yk/Sk)/\Sigma(1/Sk)$, wherein the coordinates of the selected lattice points are Xk and Yk, the standard deviations are Sk, and k is a whole number; and
determine the pressing force in the pressing manipulation by the operator on the manipulation surface of the touch panel by multiplying the load by the average of the ratios of the lattice point at the uppermost rank.

2. The touch-type inputting device according to claim 1, further comprising a glass plate adjacent the first main surface of the piezoelectric sheet, wherein the glass plate is the manipulation surface.

3. The touch-type inputting device according to claim 1, further comprising an elastic member adjacent the second main surface of the piezoelectric sheet.

4. The touch-type inputting device according to claim 1, wherein
the piezoelectric sheet is a poly-L-lactic-acid sheet having a drawing axis in a predetermined direction.

5. The touch-type inputting device according to claim 1, wherein the processing device is further configured
to make a comparison between the electrode parts which exhibit the reference voltages having a maximum absolute value and a second-largest absolute value and the electrode parts which exhibit the actually measured voltages having a maximum absolute value and a second-largest absolute value for each of the lattice points, and further define the lattice point as a lattice point to be processed when there are coincidences between the respective electrode parts and between the signs of the voltages from the respective electrode parts regardless of the ranks of the voltages.

6. The touch-type inputting device according to claim 5, wherein the processing device is further configured
to make the determination from only the maximum values when the second-ranked voltage, out of the measured voltages, has a value smaller than a predetermined threshold value.

7. A method for controlling a touch-type inputting device, the touch-type inputting device including a touch panel having a piezoelectric sheet with a piezoelectric property, and first and second electrodes on respective first and second opposed main surfaces of the piezoelectric sheet, at least one of the first and second electrodes being a split electrode having a plurality of electrode parts electrically insulated from each other, and a manipulation surface to be subjected to a pressing manipulation by an operator being extended along the first main surface of the piezoelectric sheet,
the touch-type inputting device being adapted to, when the pressing manipulation has been performed on the manipulation surface of the touch panel, make a comparison among respective voltages generated in the plurality of electrode parts in the split electrode so as to calculate a pressing-manipulated position and a pressing force, the method comprising:
a first preparatory process that sets a lattice-shaped matrix coordinate system for the manipulation surface of the touch panel;
a second preparatory process that measures voltages generated in the plurality of electrode parts due to calibrating pressing manipulations with a predetermined load at respective lattice points in the lattice-shaped matrix coordinate system; and
a third preparatory process that preliminarily stores, in a memory, the voltages obtained through the second preparatory process as reference voltages regarding the respective lattice points;
a first implementation process that determines actually-measured voltages induced in the respective electrode parts due to the pressing manipulation by the operator on the manipulation surface of the touch panel;
a second implementation process that makes a comparison between the electrode part which exhibits the reference voltage having a maximum absolute value and the electrode part which exhibits the actually measured voltage having a maximum absolute value, and a comparison between the signs thereof, regarding each of the lattice points, and that defines the lattice point as a lattice point to be processed when there are coincidences between the electrode parts and between the signs;
a third implementation process that calculates a ratio of the actually measured voltage to the reference voltage for each of the electrode parts and for each of the lattice points to be processed;
a fourth implementation process that determines an average of the ratios for the respective electrode parts for each of the lattice points to be processed;
a fifth implementation process that determines a standard deviation among the ratios for each of the lattice points to be processed;
a sixth implementation process that ranks the lattice points to be processed in an ascending order of the standard deviations;
a seventh implementation process that selects predetermined n lattice points at upper ranks out of the ranked lattice points to be processed;
an eighth implementation process that determines X and Y coordinates of a pressed position due to the pressing manipulation by the operator according to equations: $X=\Sigma(Xk/Sk)/\Sigma(1/Sk)$, and $Y=\Sigma(Yk/Sk)/\Sigma(1/Sk)$, wherein the coordinates of the selected lattice points are Xk and Yk, the standard deviations are Sk, and k is a whole number; and
a ninth implementation process that determines the pressing force in the pressing manipulation by the operator by multiplying the load by the average of the ratios of the lattice point at the uppermost rank.

8. The method for controlling the touch-type inputting device according to claim 7, wherein
in the second preparatory process and the first implementation process, the voltages induced in the plurality of electrode parts are detected through operations in a direction of pressing in the pressing manipulations on the manipulation surface of the touch panel.

9. The method for controlling the touch-type inputting device according to claim 7, wherein
in the third implementation process, out of the reference voltages, the reference voltages from the electrode parts which exhibit voltage values smaller than a predetermined threshold value are not used.

10. The method for controlling the touch-type inputting device according to claim 7, wherein
the second implementation process includes a process that makes a comparison between the electrode parts which exhibit the reference voltages having a maximum absolute value and a second-largest absolute value and the electrode parts which exhibit the actually measured voltages having a maximum absolute value and a second-largest absolute value for each of the lattice points, and that further defines the lattice point as a lattice point to be processed when there are coincidences between the respective electrode parts and between the signs of the voltages from the respective electrode parts regardless of the ranks of the voltages.

11. The method for controlling the touch-type inputting device according to claim 10, wherein
the second implementation process further comprises a process that makes the determination from only the maximum values when the second-ranked voltage, out of the measured voltages, has a value smaller than a predetermined threshold value.

12. The method for controlling the touch-type inputting device according to claim 7, wherein
in the second preparatory process and the first implementation process, the voltages induced in the respective electrode parts are detected through operations in a direction of counter-pressing in the pressing manipulations on the manipulation surface of the touch panel.

13. The method for controlling the touch-type inputting device according to claim 12, further comprising a process that determines whether the voltages induced in the respective electrode parts have been detected through operations in the direction of pressing or through operations in the direction of counter-pressing in the pressing manipulations on the manipulation surface of the touch panel, based on polarities of the voltages having the maximum absolute values out of the voltages induced in the respective electrode parts in the second preparatory process and in the first implementation process.

* * * * *